(12) United States Patent
Hall

(10) Patent No.: US 9,601,945 B2
(45) Date of Patent: Mar. 21, 2017

(54) EMERGENCY BACK-UP POWER SYSTEM FOR TRACTION ELEVATORS

(71) Applicant: Reynolds & Reynolds Electronics, Inc., Allentown, PA (US)

(72) Inventor: James C. Hall, Allentown, PA (US)

(73) Assignee: Reynolds & Reynolds Electronics, Inc., Allentown, PA (US)

( * ) Notice: Subject to any disclaimer, the term of this patent is extended or adjusted under 35 U.S.C. 154(b) by 473 days.

(21) Appl. No.: 14/153,158

(22) Filed: Jan. 13, 2014

(65) Prior Publication Data

US 2014/0209415 A1   Jul. 31, 2014

Related U.S. Application Data

(60) Provisional application No. 61/757,943, filed on Jan. 29, 2013.

(51) Int. Cl.
*B66B 1/06* (2006.01)
*H02J 9/06* (2006.01)
*B66B 5/02* (2006.01)

(52) U.S. Cl.
CPC .............. *H02J 9/062* (2013.01); *B66B 5/027* (2013.01)

(58) Field of Classification Search
CPC ................................. H02J 9/062; B66B 5/027
USPC ....... 187/247, 277, 289, 290, 293, 296, 297, 187/391, 393; 307/66, 69
See application file for complete search history.

(56) References Cited

U.S. PATENT DOCUMENTS

| | | | | |
|---|---|---|---|---|
| 4,316,097 A * | 2/1982 | Reynolds | .................. | B66B 5/02 187/290 |
| 4,379,499 A * | 4/1983 | Nowak | .................... | B66B 5/027 187/290 |
| 4,666,020 A * | 5/1987 | Watanabe | ................. | B66B 5/02 187/290 |
| 5,732,795 A * | 3/1998 | McCarthy | ................. | B66B 1/34 187/250 |
| 6,460,658 B2 * | 10/2002 | Suga | ......................... | B66B 1/30 187/290 |
| 6,474,447 B2 * | 11/2002 | Tajima | ...................... | B66B 1/30 187/290 |
| 7,275,622 B2 * | 10/2007 | Hall | .......................... | B66B 5/02 187/277 |
| 7,497,304 B2 * | 3/2009 | Matsuoka | ............. | B66B 5/0031 187/290 |
| 7,511,975 B2 | 3/2009 | Hammond | | |
| 7,650,968 B2 | 1/2010 | Oesterle et al. | | |

(Continued)

*Primary Examiner* — Anthony Salata
(74) *Attorney, Agent, or Firm* — Wendy W. Koba

(57) ABSTRACT

An emergency power supply for a traction elevator system utilizes a microprocessor-based control arrangement with pulse-width modulator technology to create an efficient, cost-effective back-up power system for a traction elevator. The microprocessor-based control arrangement is used to sense a power loss, or any type of irregularity in the power supply. Upon sensing some type of power malfunction, the microprocessor-based control arrangement disconnects the elevator system from the main power source and then generates a control signal to initiate the supply of back-up power. Once the elevator electrical system has been recharged and stabilized, the elevator control system will sense that recovery has occurred and will then provide an appropriate speed and direction command to the traction motor drive system.

5 Claims, 6 Drawing Sheets

(56) References Cited

U.S. PATENT DOCUMENTS

| | | |
|---|---|---|
| 7,775,328 B2 | 8/2010 | Robledo Barrio et al. |
| 8,146,714 B2 | 4/2012 | Blasko |
| 8,230,978 B2 | 7/2012 | Agirman et al. |
| 2014/0116810 A1* | 5/2014 | Vrankovic .............. B66B 1/302 187/290 |

* cited by examiner

TIMING SYSTEM

MAIN POWER CONTROL

DC TO DC INVERTER CONVERTER

THREE PHASE GENERATOR

EMERGENCY BACK-UP POWER SYSTEM FOR TRACTION ELEVATORS

CROSS-REFERENCE TO RELATED APPLICATIONS

This application claims the benefit of U.S. Provisional Application Ser. No. 61/757,943, filed Jan. 29, 2013 and herein incorporated by reference.

TECHNICAL FIELD

The present invention relates to power system controls for traction elevators and, more particularly, to a microprocessor-controlled emergency back-up power system for traction elevators.

BACKGROUND OF THE INVENTION

With the globalization of the elevator industry there has been a trend to standardize elevator systems worldwide. This trend is leaning toward the use of traction systems for smaller elevator applications (i.e., less floors). Previously, hydraulic elevator systems were commonly used in applications with less than seven landings. The trend anticipates that these applications will begin to utilize traction elevator systems. Such systems must be provided with emergency or back-up power systems that supply power not only to the controller, door operator, and valves, but also to the main drive system.

Recent developments have lead to traction elevator systems replacing older technology (i.e., "soft start" systems) with new Variable Voltage/Variable Frequency Drive (VVVFD) technologies. VVVFD technology has two advantages: first, VVVFD technology allows a traction motor to be connected to the main power system with a low level of inrush current; and second, VVVFD technology allows a traction motor to run at both a very low speed and a very low power. Thus, while a typical traction motor might be a 20 hp three-phase load when running at a normal speed, a VVVFD-based motor may only be a 2 hp load at its slowest speed. The reason for this low load is that a traction elevator system comprises a counter-weighted configuration. That is, the elevator's typical loading of passengers (i.e., the passenger weight) is exactly matched by the counter weight. This allows for optimal efficiency of the system. However, under most elevator conditions, an exact matching of the counter weight and the passenger load does not occur. Thus, a traction elevator will tend to drift up or down depending on this imbalance.

By continually monitoring the elevator load, it is possible to keep track of which direction the car would drift. When a power outage occurs, this information is available for use by the emergency back-up power system. Also, to handle the capacitive nature of the VVVFD and its input filtering, a three phase inductor system is placed between an inverter output stage and the VVVFD, so as to compensate for the reactance of the input filter.

Furthermore, unlike the hydraulic elevator systems, a traction elevator system requires that the back-up power system provide full power to the traction motor (e.g., >20 hp load at full motor speed), even when normal building power is present and properly functioning. This requires that the back-up power system be capable of switching a high power load. This requirement to handle high levels of normal power results in a system where the back-up power is fed in parallel to the normal control power system. As a result, it is critical to control the sequencing of the various power systems so as to assure that both the back-up power and the normal control power sources are not simultaneously connected to the traction elevator system.

SUMMARY OF THE INVENTION

The needs remaining in the prior art are addressed by the present invention, which relates to power system controls for traction elevators and, more particularly, to an emergency back-up power system for traction elevators.

In accordance with the present invention, an emergency power supply for a traction elevator system has been configured that utilizes a microprocessor-based control arrangement with pulse-width modulator technology to create an efficient, cost-effective back-up power system for a traction elevator. The microprocessor-based control arrangement is configured to sense a power loss, or any type of irregularity in the power supply (i.e., the incoming three-phase power from a utility company). Upon sensing some type of power malfunction, microprocessor-based control arrangement disconnects the elevator system from the main power source, and then generates a control signal to initiate the supply of back-up power. The control arrangement also provides an indicator signal, allowing the elevator controller to know that the elevator system is now using "emergency" power, as well as a low-voltage parallel power feed to the elevator system (i.e., in parallel with the emergency power). Once the elevator electrical system has been recharged and stabilized, the elevator controller will sense that recovery has occurred and will then provide an appropriate speed and direction command to the traction motor drive system.

One particular aspect of the present invention is the ability to provide a pure three-phase sine wave output for elevator control. By virtue of using microprocessor-based control of the pulse width modulation of the output waveform, it is possible to create and maintain the preferred three-phase sine wave output. By controlling the output pulse width modulation, an accurate sine wave can be generated, while at the same time minimizing the voltage on the high-voltage DC bus.

An exemplary embodiment of the present invention takes the form of a back-up power system for a traction elevator comprising a microprocessor-based control arrangement configured to recognize a loss of an input power supply, as well as irregularities in the power supply (including phase irregularities), where the microprocessor-based control arrangement includes a control module for generating a control signal to remove the input power supply from the traction elevator and a pulse-width modulated indicator signal. The back-up power system includes an inverter timing system operatively connected to the microprocessor-based control arrangement, wherein the inverter timing system receives the indicator signal from the microprocessor-based control arrangement. A back-up power generating means is included that communicates with the inverter timing system, wherein the back-up power generating means generates an output to provide back-up power. The inverter timing system includes a job cycle lockout timer, which limits an amount of time that the back-up power generating means supplies output power and ensures operation of a full elevator cycle prior to returning to normal control power. A main power lockout timer is also included, which prevents simultaneous operation of the back-up power system and normal control power.

Other and further aspects and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
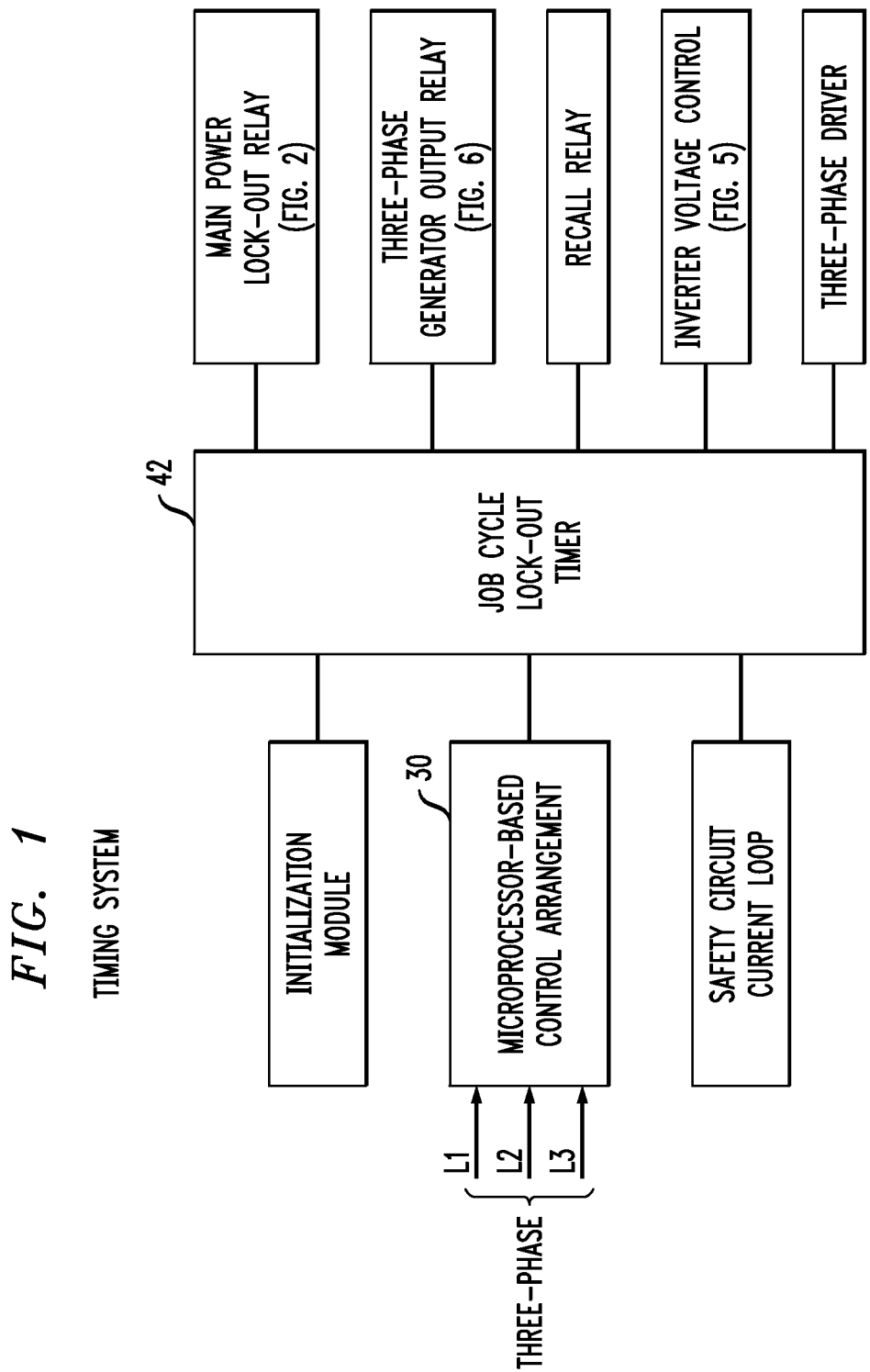
FIG. 1 is block diagram of an overall power system for a traction elevator.
Figure 2:
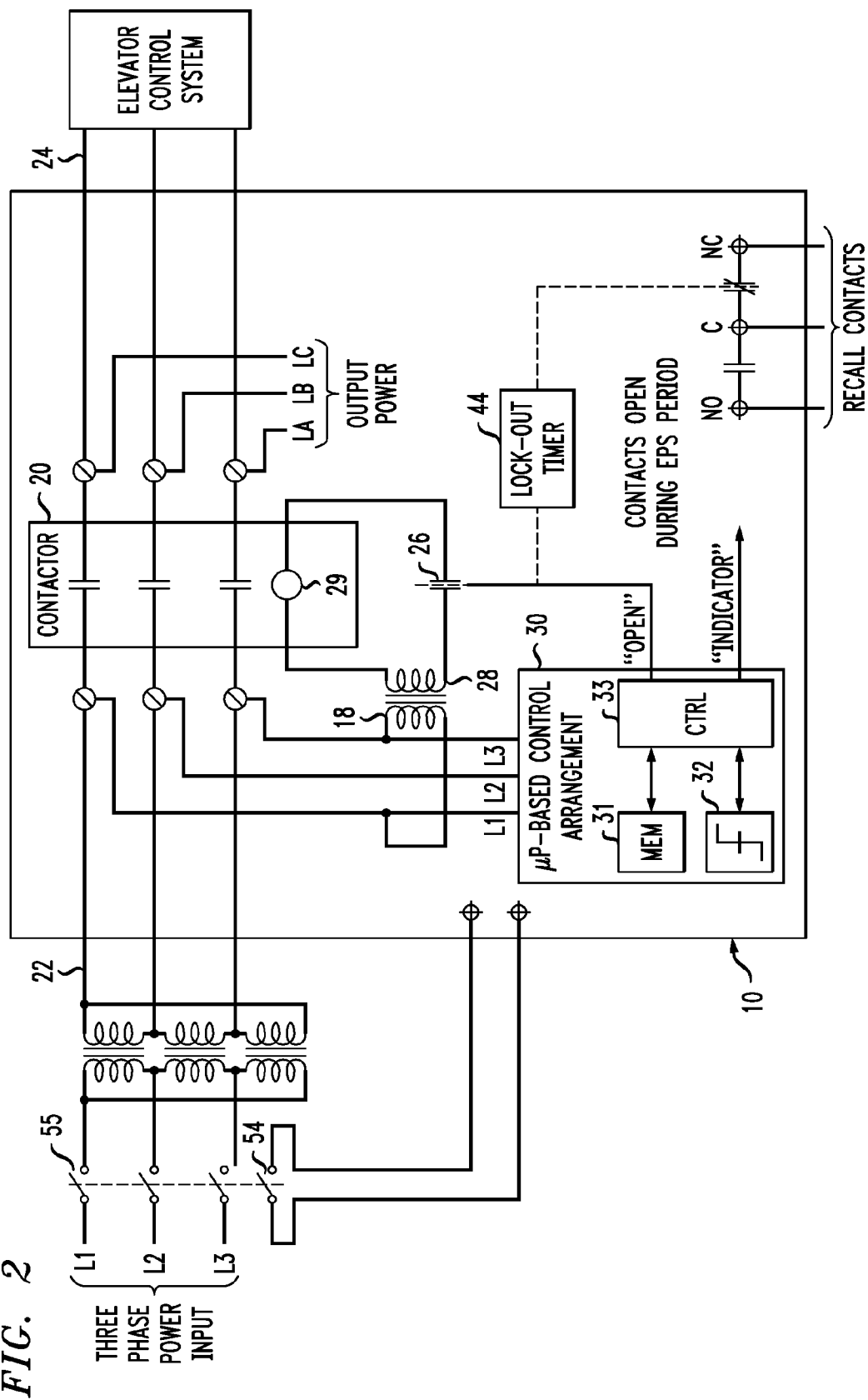
FIG. 2 is a detailed circuit diagram of various aspects of a back-up power system formed in accordance with the present invention.

FIG. 1 is block diagram of an overall power system for a traction elevator and FIG. 2 is a more detailed circuit diagram of the relevant aspects of a back-up power system 10. The back-up power system 10 consists of three major areas: 1) normal power control; 2) microprocessor-based control arrangement for power sensing and inverter timing systems; and 3) a backup power generation system.

Figure 3:
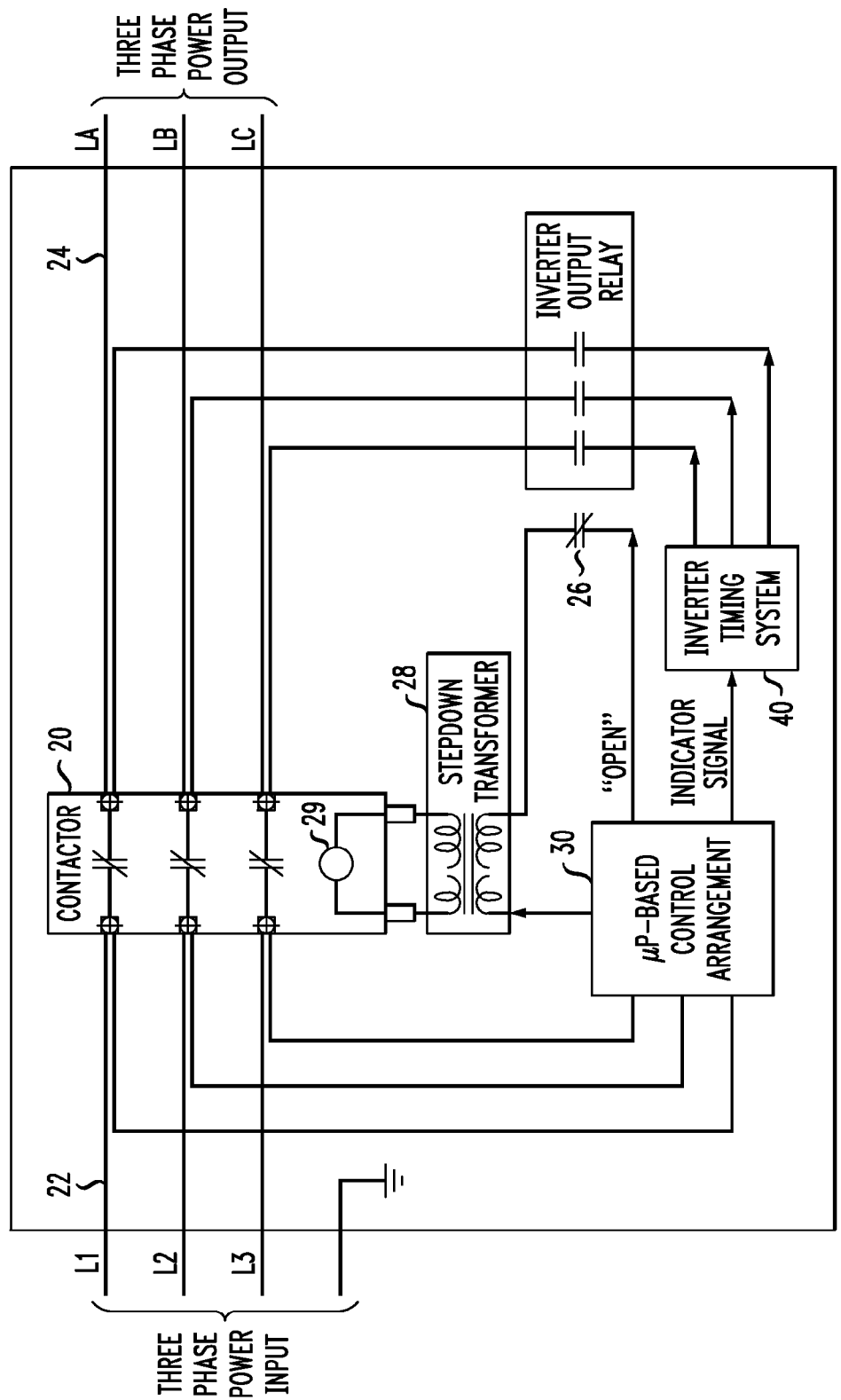
FIG. 3 is a circuit diagram of the main power control of the present invention.

Referring to FIGS. 2 and 3, normal power control is done via the main contactor 20 and supporting systems. The normal power input source is connected on the line side 22 of the main contactor 20. The elevator system load (i.e., the traction motor itself) is connected on the load side 24 of the main contactor 20. Under normal power conditions, the power on the line side of the main contactor 20 is connected through a normally-closed contact 26 (and perhaps an optional step-down transformer 28) to the line side output of contactor 20. Normally-closed contact 26 is shown as one element of a job cycle lock-out timer 42. The operation of job cycle lockout timer 42 will be described in more detail below. Transformer 28 allows for a common contactor design approach for a wide range of system voltages. This design may use normal input power to power coil 29 within contactor 20. This approach reduces the power requirement on the inverter battery system and allows for normal system operation when the system is turned off.

Still referring to FIGS. 2 and 3, the three-phase input power is monitored within power loss sensing arrangement 30. Various configurations may be used for a microprocessor-based version of arrangement 30, including a memory 31 component that stores various power levels suitable for acceptable operation in different implementations. Threshold circuitry 32 may be included in the microprocessor-based power loss sensing arrangement to determine when the input power level has dropped below a predetermined value. Other components may be used to sense any type of power irregularity. Upon sensing a power loss or irregularity, a control module 33 within the microprocessor-based power loss sensing arrangement generates a control signal to "open" contactor 20 and remove the main power supply from the elevator control system. As shown in FIG. 2, control module 33 performs this function by sending a control signal to (normally-closed) contact 26, activating contact 26 to move into its "open" position. Opening contact 26 thus disconnects the elevator system from the main power system. Additionally, control module 33 of the microprocessor-based power loss sensing arrangement will transmit an indicator signal to inverter timing system 40, indicating that the elevator system requires emergency power.

Referring now to FIGS. 1-3, the inverter timing system 40 consists of job cycle lock-out timer 42 (mentioned above) and a main power lockout timer 44. Typically, emergency power units permit the elevator system to operate until either normal control power is restored or a low battery voltage condition is present. These conditions are not desirable for high power applications. The job cycle lock-out timer 42, therefore, sets a maximum amount of time that back-up power is permitted to supply power to the elevator system. This approach also optimizes the back-up power battery system design. In addition, the job cycle lock-out timer 42 assures that a full cycle has been completed before the elevator system is returned to normal control power. This allows for the operation of a full elevator cycle thereby allowing any person on the elevator to be transported to a rescue destination (e.g., the nearest floor in the overhauling direction) prior to the elevator system switching back to normal control power. Prior systems would transfer power back and forth between normal control power and emergency power, if periodic brown-outs were to occur (e.g., every 30 seconds).

In accordance with the attributes of the present invention, the particular time intervals as used by inverter timing system 40 may be programmed within the microprocessor-based power loss sensing arrangement and, therefore, modified as necessary by personnel in charge of maintaining the elevator's functionality.

The main power lock-out timer 44 performs two functions. First, it disconnects the load from normal control power when a power irregularity is detected. Second, it will not reconnect the elevator system to normal control power until after the inverter timing system 40 is shutdown and disconnected. Therefore, the inverter timing system 40 prevents simultaneous operation of the back-up power system and normal control power. Once again, the control and indicator signals as generated by control module 33 within the microprocessor-based power loss sensing arrangement 30 ensure that the back-up power system has been disconnected before bringing the normal power supply back on line.

Figure 4:
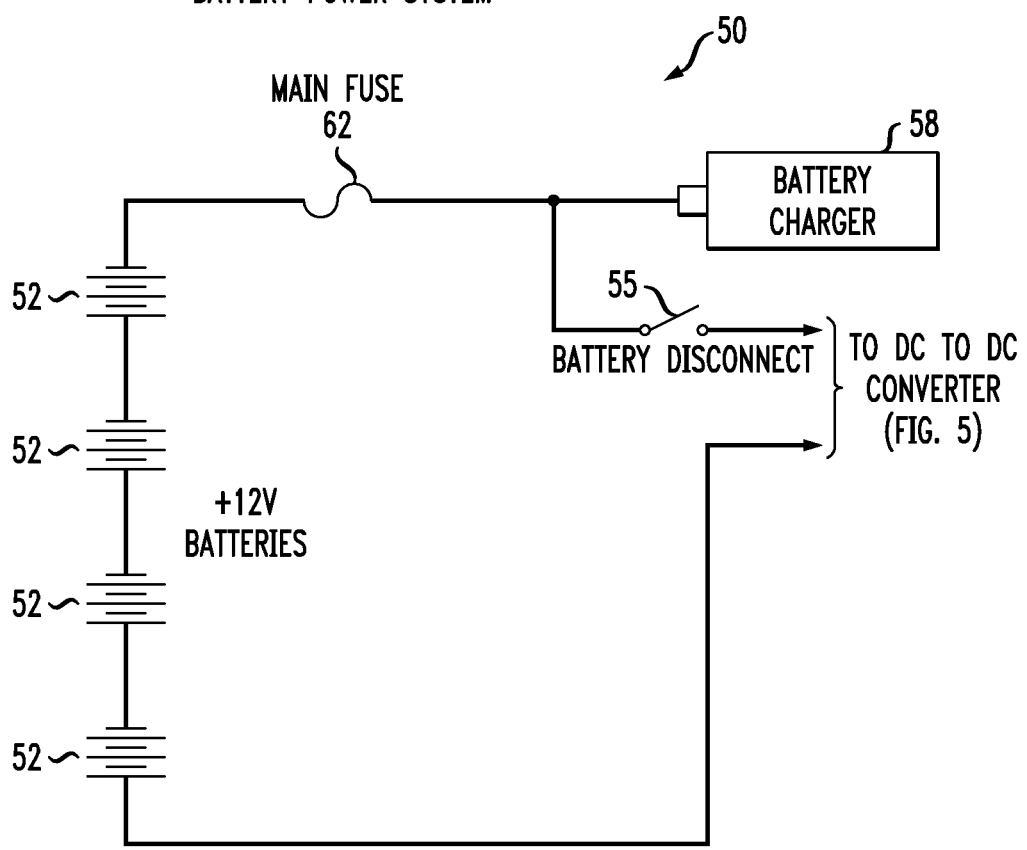
FIG. 4 is a circuit diagram of the battery power system of the present invention.
Figure 5:
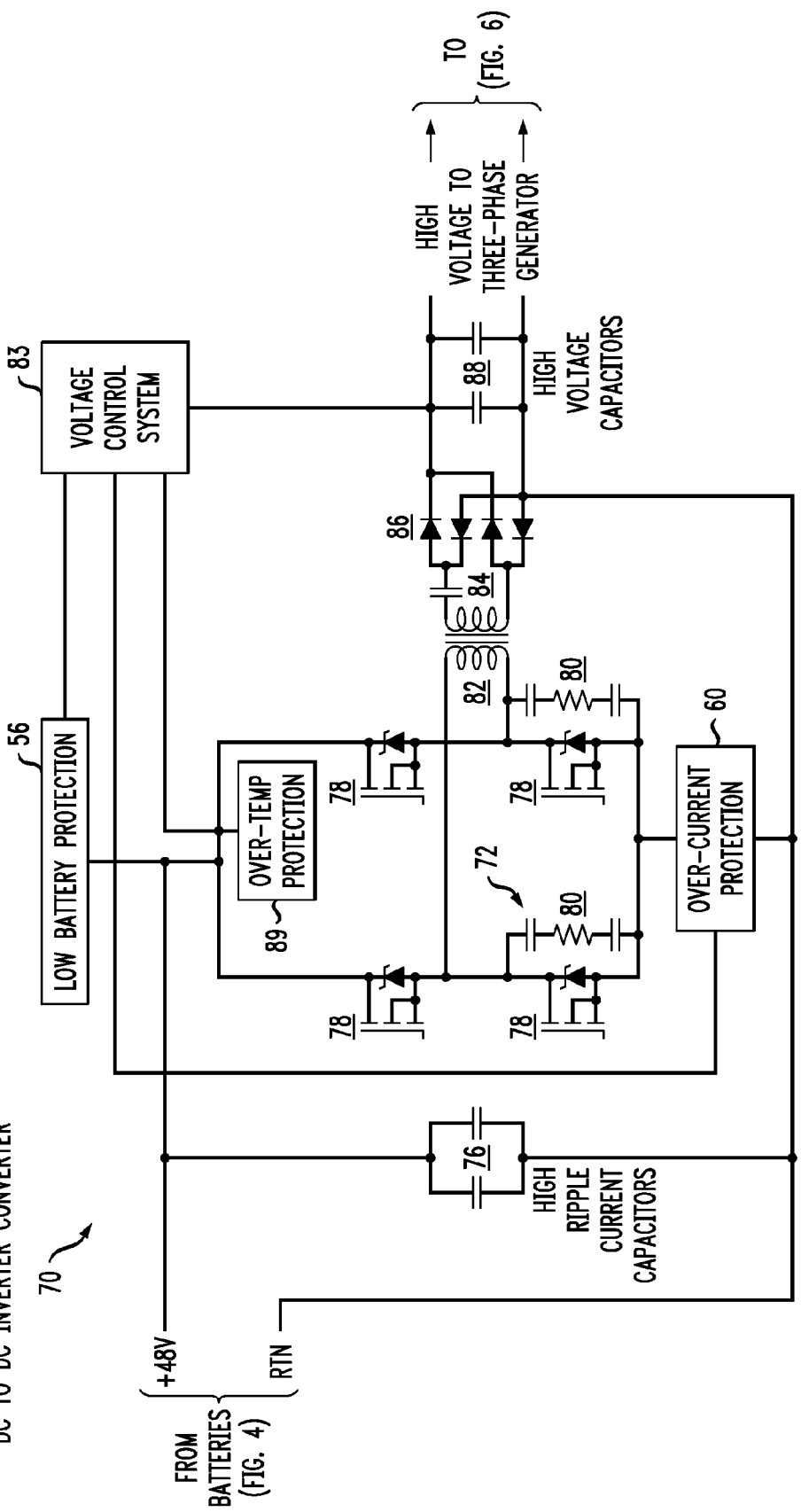
FIG. 5 is a circuit diagram of the dc/dc inverter converter of the present invention.
Figure 6:
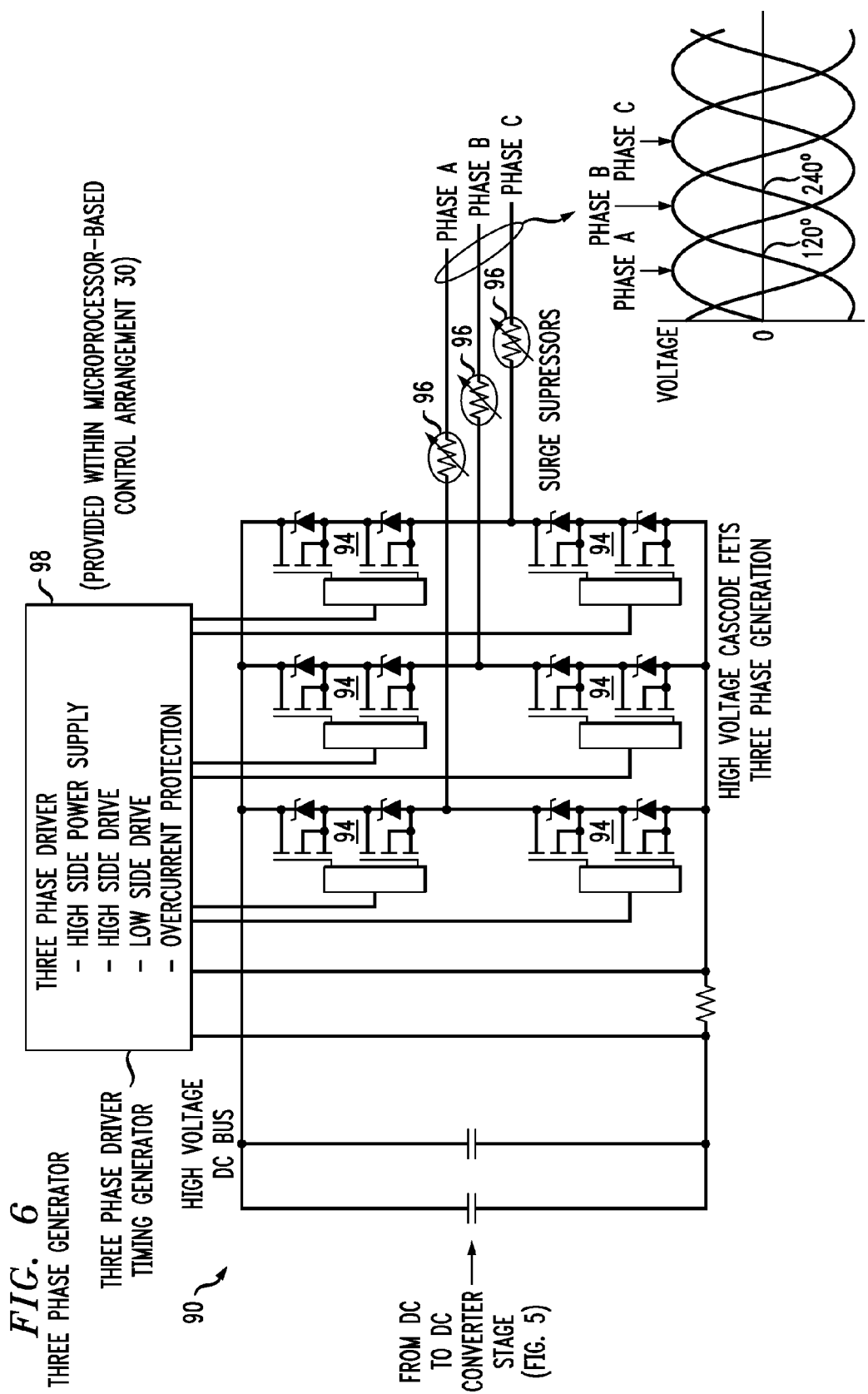
FIG. 6 is a circuit diagram of the three-phase generator of the present invention.

Referring to FIGS. 4-6, the back-up power generation system consists of three areas: 1) a dc battery power system 50; 2) a dc/dc converter 70; and 3) a three phase generator 90.

Referring to FIGS. 2, 4, and 5, the battery power system 50 includes battery cells 52, a maintenance safety circuit 54, a low battery detection circuit 56, a battery charger system 58, a battery over-current circuit 60, and a main power overcurrent device 62. A 48V system is an optimal design because the system current levels are still at a level where wiring can be used instead of bus bars. Furthermore, even though a higher rated voltage system would reduce the current level of the system, such a design would require more batteries and would thus be a more expensive configuration.

The maintenance safety circuit 54, which further includes a battery disconnect switch 55, prevents the operation of the back-up power system during maintenance operations. The disconnect switch 55 prevents inadvertent operation of the back-up power system while the elevator is locked-out for maintenance. As shown in FIG. 4, when the disconnect switch 55 is opened, no power is available to the control logic of the dc to dc converter, thus preventing the inverter 70 (FIG. 5) from being started, or the inverter output relay from being closed. The low battery detection circuit 56, as shown in FIG. 5, protects the lifetime capacity of the batteries 52 by stopping the job cycle lock-out timer 42 if the voltage of the batteries 52 falls too low. The life of a battery is a function of the charge/discharge cycles it sees and how deep (i.e. level of discharge) the cycles are. By controlling the depth of the discharge cycle, the lifetime capacity of the batteries 52 can be maintained.

The battery charging system 58 is provided to permit long term operation of the battery power system 50. This battery charging system 58 is powered from the input line power source and under normal control power provides a current limiting and a voltage limiting charge to the batteries 52. After a job cycle has occurred and normal control power is restored, the battery charging system 58 will initially operate in a current limiting mode with the charging voltage determined by the battery system. As the batteries 52 charge, the battery voltage will rise until the charger's voltage limit is reached and then the charging system 58 operates in a voltage limiting mode until the next job cycle is required.

The battery over-current protection circuit 60 (i.e., overload protection circuit) provides protection to the backup batteries 52 and prevents the back-up control power system from overheating. The over-current circuit 60 consists of a high frequency current sensor that performs cycle by cycle current level sensing. If the current level exceeds the safe level for the battery power system 50, the over-current circuit 60 will shutdown the converter 70. However, the battery over-current circuit 60 will only operate if an inverter primary FET control circuit 72 is operational. Therefore, if either the FET 78 or the inverter primary FET control circuit 72 fail, the battery over-current protection 60 system may not function correctly. Therefore, a main battery overcurrent device 62 (shown in FIG. 4) is provided to protect the battery system against a failure of FET 78. Operation of the primary FET control circuit 72 will be subsequently described.

Referring to FIG. 5, the configuration of the dc/dc converter 70 was selected to optimize the simplicity of the design. The converter 70 consists of a primary FET resonant mode H-bridge configuration control circuit 72 and a high ripple current compatible capacitor system 76. The FET circuit 72 comprises field effect transistors (FET's) 78 and, perhaps, optional RC snubber circuits 80. The FET circuit 72 is utilized to drive a main transformer 82 and utilize its leakage inductance to provide a resonant mode power source for a secondary 84 of the main transformer 82. The secondary 84 is connected via a tuning capacitor to a high speed full bridge rectifier 86 combined with a low resistance capacitor bank 88. Alternatively, the tuning capacitor may be placed in series with the primary winding. The pulse width of the main transformer 82 and primary FET circuit 72 are controlled via a voltage feedback control system 83 that controls the DC bus voltage. To allow safe maintenance operations on the unit, the high voltage dc bus is automatically discharged whenever normal control power is restored or when the unit is switched off. In addition, the converter 70 will pre-charge the dc bus capacitors of the capacitor bank 88 before the converter 70 is connected to the elevator system. This allows for a soft start of the converter 70 and for the feedback control system 83 to stabilize. An over-temperature circuit 89 is provided to protect the power FET's 78 from experiencing too high a temperature. To prevent this from occurring, the temperature of the heat sink is monitored. If the temperature of the heat sink exceeds its temperature limit, the job cycle lock-out timer 42 is stopped and the converter 70 is shutdown. Advantageously, various elements of the system control functionality utilized to monitor and operate the battery back-up properties are incorporated within the microprocessor-based control arrangement, allowing the features, details, limits and the like to be evaluated and modified, as necessary.

In choosing an FET 78, several properties must be met. First, the FET 78 must have a sufficiently low $R_{ds-on}$ so as to not generate a large amount of heat while conducting the large primary battery currents. Second, the FET 78 must be packaged such that heat can be efficiently dissipated. Third, the FET 78 must have a voltage rating that sufficiently exceeds the battery system voltage so as to minimize the occurrences of avalanching the protection diode. Fourth, the FET 78 must switch quickly to allow for operation of the main transformer 82 at a frequency that will reduce its size via reducing the volt-seconds applied to the main transformer 82. Finally, the FET 78 must have a current rating compatible with the anticipated battery current levels.

During operation, while the battery power system 50 provides the overall back-up power for the elevator system, a high frequency power source and storage source are required. The converter 70 needs to quickly ramp up the current (as well as quickly ramp down the current in the opposite state). A capacitor system 76 supports this by allowing the majority of the ac current required by the converter 70 to be sourced from the capacitors of the capacitor system 76. Therefore, the capacitor system 76 also further optimizes life of the battery system.

In addition, the capacitor system 76 supports optimization of the FET's 78 and (optional) RC snubbers 80. When power flow into the main transformer 82 is stopped during a dead time, a high flyback voltage may occur. This voltage can be high enough to avalanche the power FET 78 integral protection diodes. While the devices chosen for this design are compatible with this type of operation, the avalanching causes a large instantaneous power dissipation as well as increasing the power loss for the system. The use of a resonant mode H-bridge configuration 72 minimizes this flyback voltage by switching the FETs off when they are in a low current condition. In addition, the (optional) RC snubber circuits 80 will slow down the flyback voltage.

Referring to FIG. 6, the back-up power generation system includes a three phase generator 90 that takes the dc bus voltage and sequentially switches it through cascaded FETs such that it generates three sine wave outputs. This waveform requires a DC bus voltage of approximately 680 VDC to generate a 400-480 VAC rms sine wave output.

The three phase generator 90 comprises an FET-based circuit 90 configured as three half-bridge cascaded field effect transistors (FETs) 94 (it is to be noted that the cascaded arrangements may be replaced by a single FET or a high frequency insulated gate bipolar transistor (IGBT)— for each phase—in an alternative embodiment). FETs 94 provide a correct 120 degree phasing between any two phases. The generator 90 further includes surge limiting by using NTC thermistors 96. The thermistors 96 limit the initial load surge current required to charge the capacitors and transformers in the elevator system. However, after a short period of time, the thermistors 96 reduce their current limiting and support normal operation of the system with minimal losses. An output over-current protection 98 (i.e., fault) is provided at the sine wave output of the three phase generator 90 and provides two levels of protection. First, because the FETs 94 have a maximum current rating that should not be exceeded, the over-current protection 98 will shutdown the output stage of the generator 90 if the maximum short duration output current limit is exceeded for a short period (i.e., micro-seconds). Second, to prevent an overload condition on the output of the generator 90, the over-current protection 98 will shutdown the generator 90 if the output current level exceeds an adjustable limit for a predetermined period of time (i.e., within milliseconds). Finally, the generator 90 may further contain output fuses as a back-up to the output over-current protection 98 in the event that the over-current protection 98 does not function correctly.

The simplicity of this device, its simple interface with the rest of the elevator system, and its single box, microprocessor-based self-contained design make it unique. Other devices require a much higher degree of interconnecting wires and system integration to work correctly. This back-up power system 10 requires installing only seven power cables (i.e., three power wires into the unit, cabinet ground, three power wires out), the two safety circuit wires to the main disconnect, and the two wires for signaling the elevator controller to initiate a rescue operation.

While the invention has been described with reference to specific embodiments, various changes may be made and equivalents may be substituted for elements thereof by those skilled in the art without departing from the scope of the invention. In addition, other modifications may be made to adapt a particular situation or method to the teachings of the invention without departing from the essential scope thereof.

What is claimed is:

1. A back-up power system for a traction elevator comprising:
    a microprocessor-based control arrangement configured to recognize a loss of an input power supply, as well as irregularities in the power supply, including phase irregularities, the microprocessor-based control arrangement including a control module for generating both a control signal to remove the input power supply from the traction elevator, and a pulse-width modulated indicator signal;
    an inverter timing system operatively connected to receive the pulse-width modulated indicator signal from the microprocessor-based control arrangement;
    a back-up power generating means communicating with the inverter timing system, wherein the back-up power generating means generates an output to provide back-up power to the traction elevator, wherein the inverter timing system includes a job cycle lockout timer, which limits an amount of time that the back-up power generating means supplies output power and ensures operation of a full elevator cycle prior to returning to normal control power; and
    a main power lockout timer, which prevents simultaneous operation of the back-up power system and normal control power.

2. The backup power system of claim 1, wherein the back-up power generating means further comprises: a dc battery power system; a dc/dc converter operatively connected to the output of the dc battery power system; and a three-phase generating means operatively connected to an output of the dc/dc converter, wherein the generating means generates an output consisting of a plurality of sine wave outputs.

3. The backup power system of claim 2, wherein the dc battery power system further comprises: at least one dc battery; and a battery charger system operatively connected to the batteries, wherein the charger system charges the dc battery under normal control power operation.

4. The back-up power system of claim 2, wherein the dc/dc converter further comprises: a capacitor system to provide an ac current source to the converter; a transformer, wherein a secondary of the transformer is operatively connected to a bridge rectifier and a low resistance capacitor bank to provide a dc voltage to the back-up generating means; and an H-bridge configuration FET circuit to drive the transformer.

5. The back-up power system of claim 2, wherein the three phase generating means further comprises at least one half bridge IGBT or FET system, wherein the IGBT or FET system provides a 120 degree phasing between any two sine wave outputs.

* * * * *